April 4, 1933. V. H. WINQUIST 1,903,383
CONVEYER DRIVE MEANS
Filed June 13, 1931 5 Sheets-Sheet 1
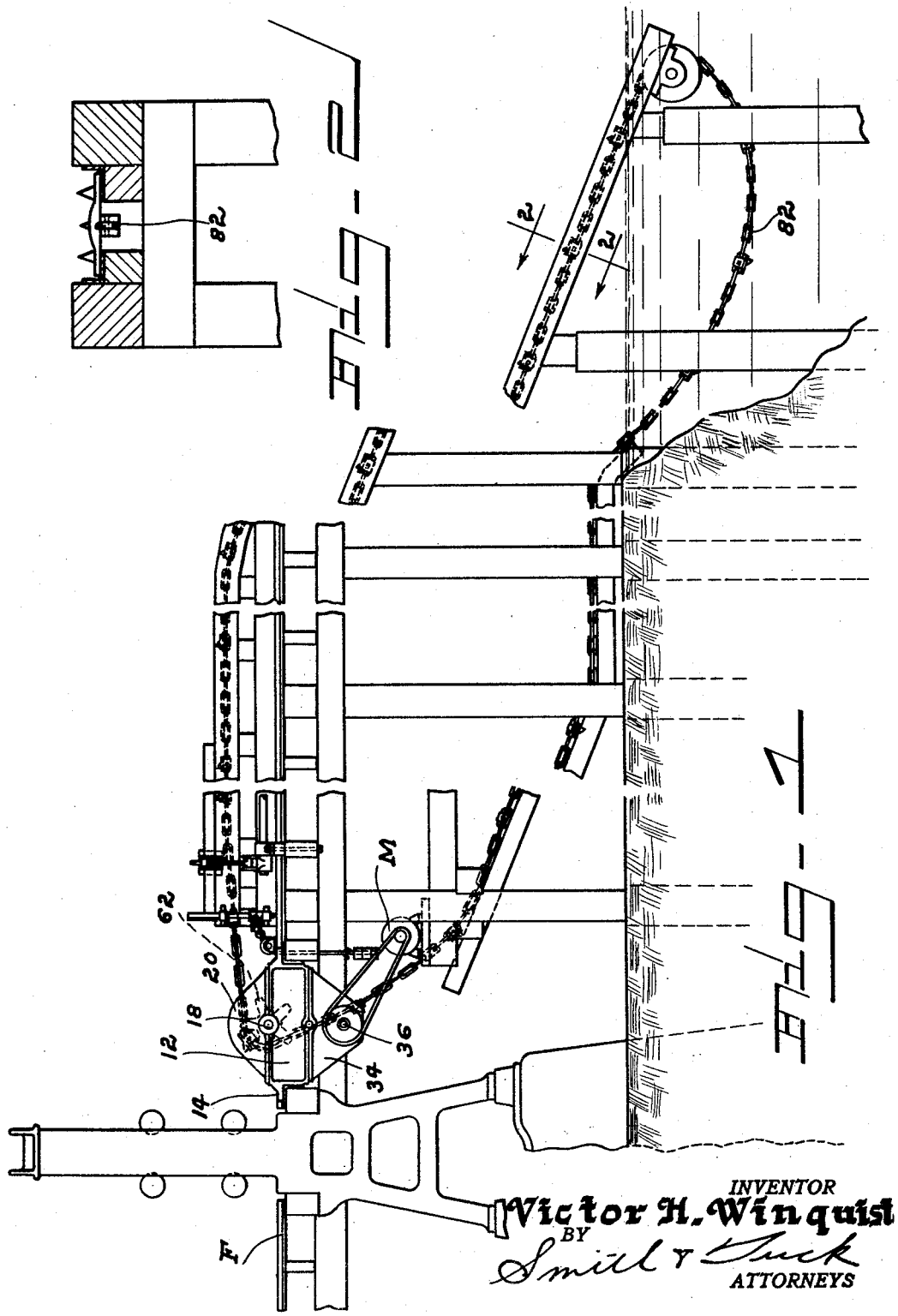

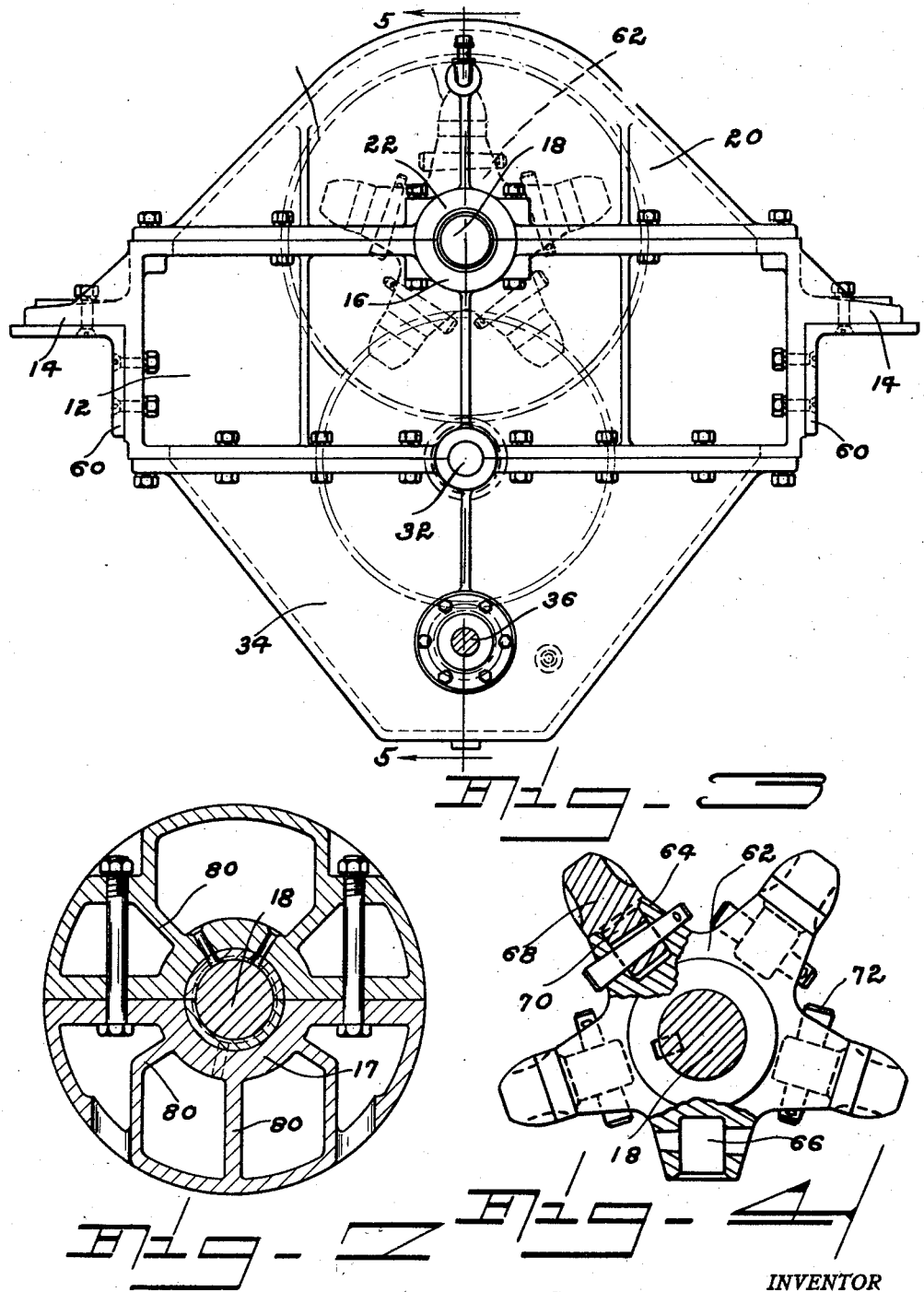

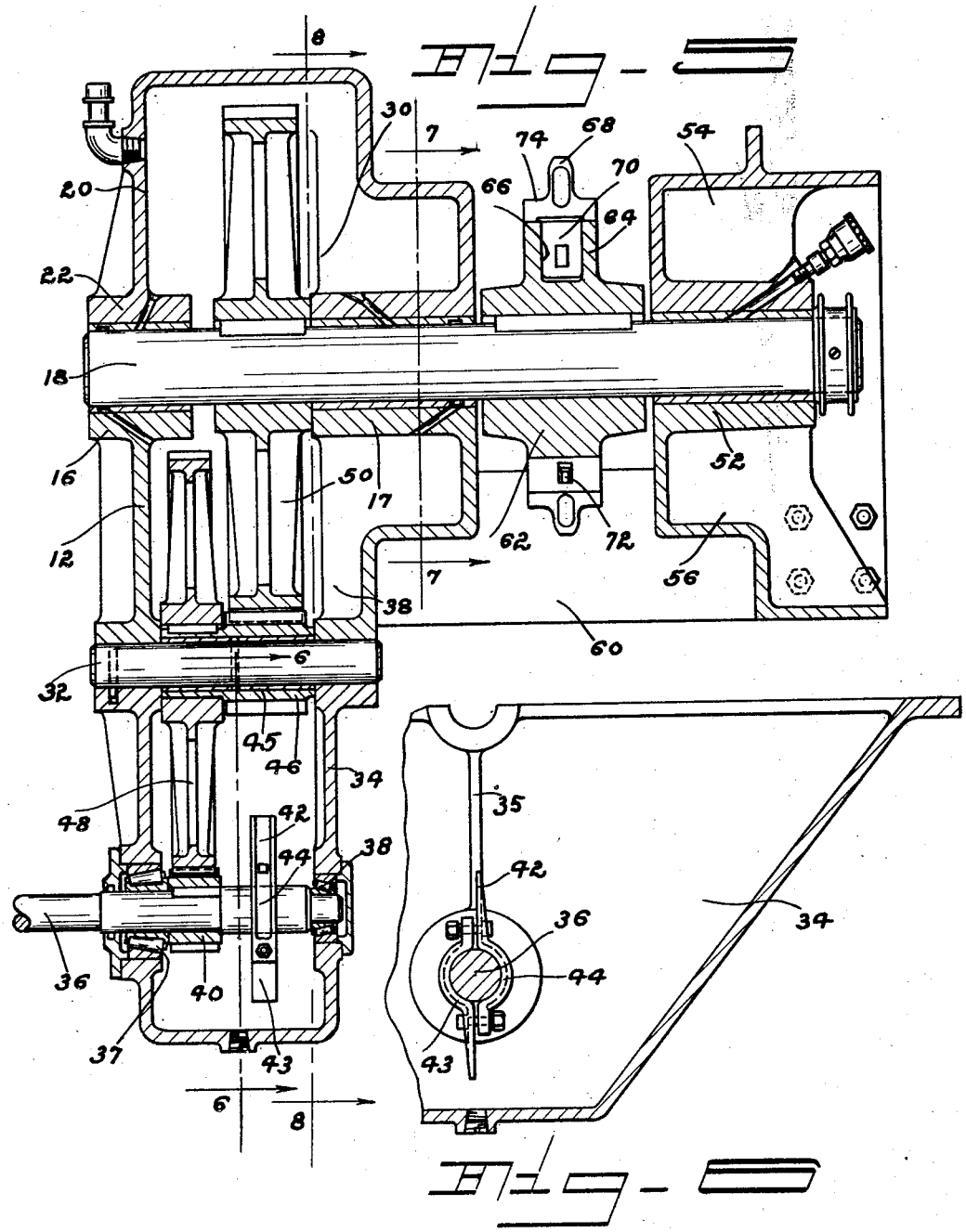

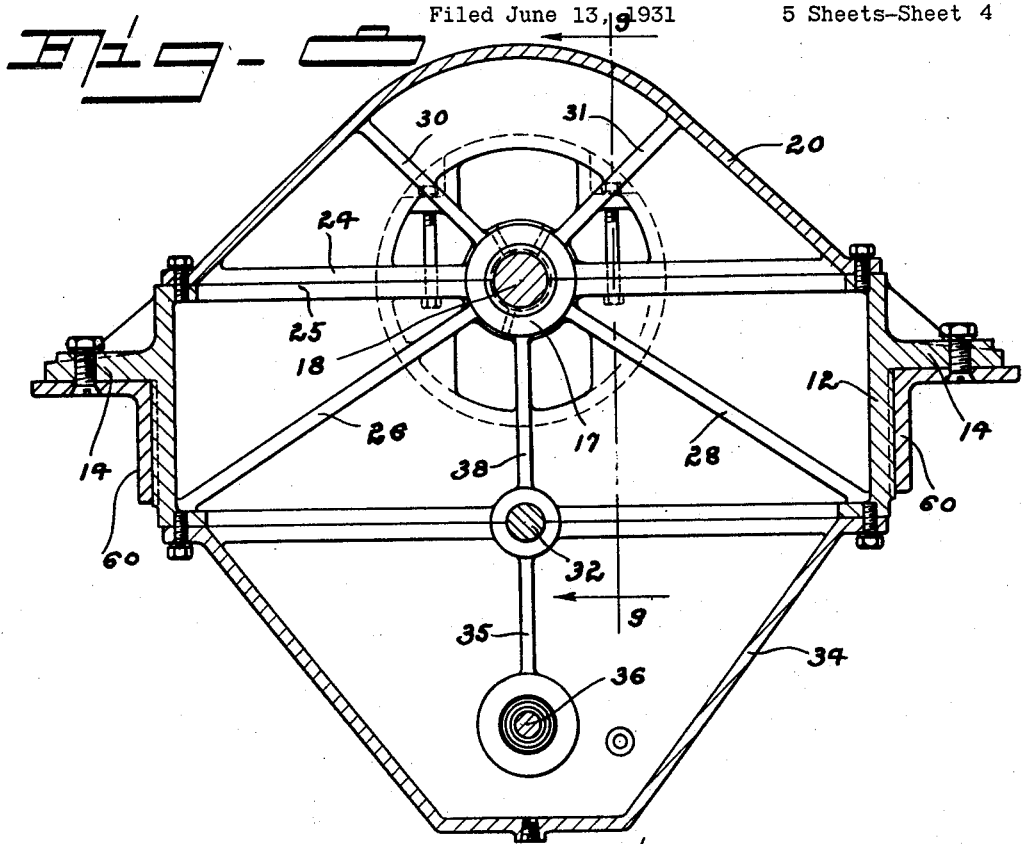
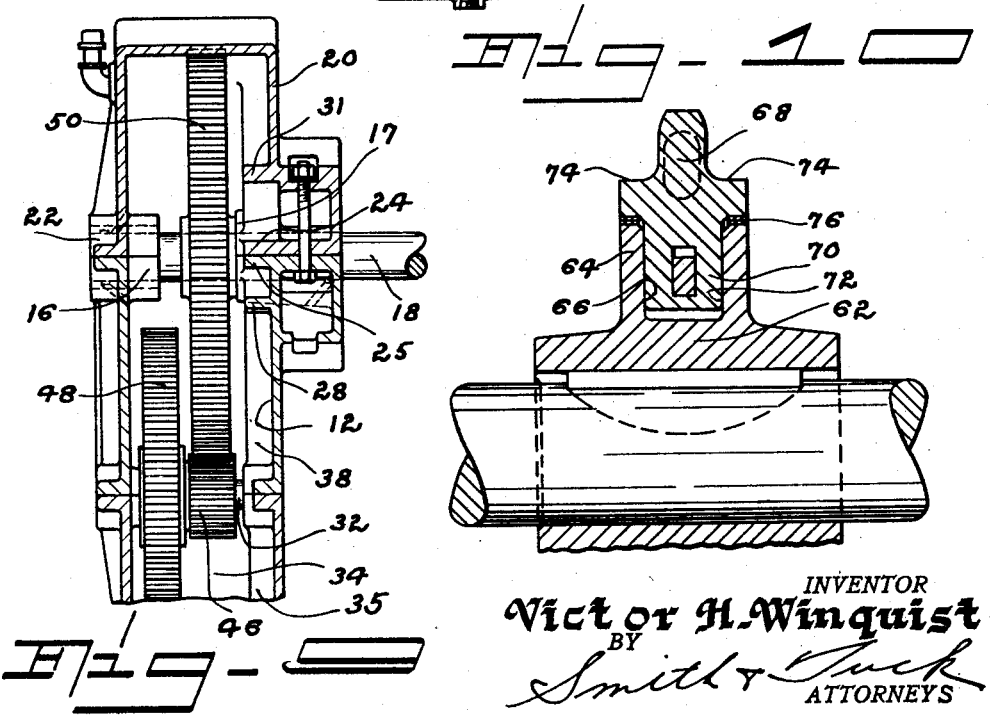

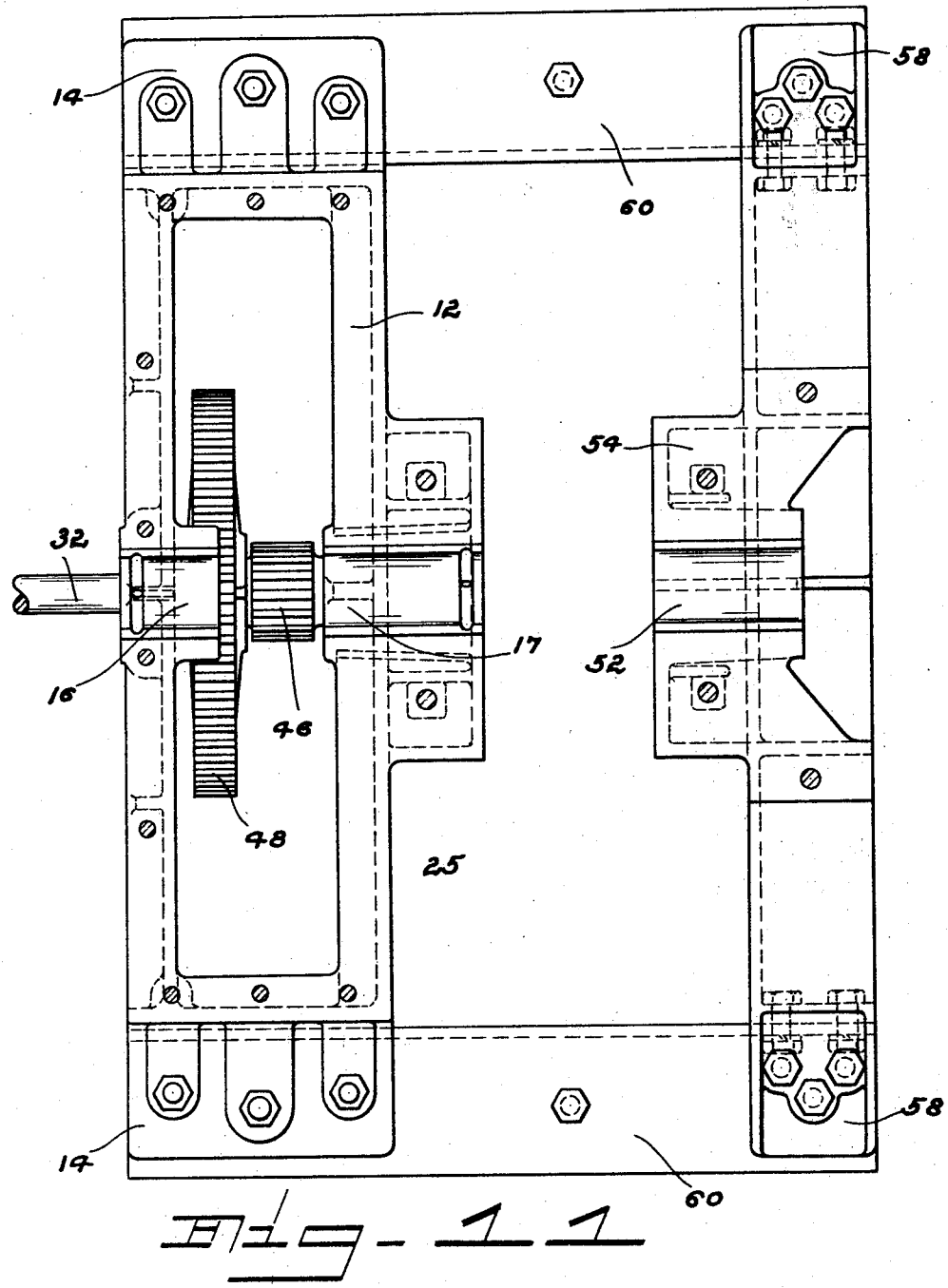

Patented Apr. 4, 1933

1,903,383

UNITED STATES PATENT OFFICE

VICTOR H. WINQUIST, OF SEATTLE, WASHINGTON, ASSIGNOR TO MILL ENGINEERING AND SUPPLY COMPANY, OF SEATTLE, WASHINGTON, A CORPORATION OF WASHINGTON

CONVEYER DRIVE MEANS

Application filed June 13, 1931. Serial No. 544,276.

My present invention relates to the art of conveyer machinery and more particularly to a conveyer drive means.

A particularly useful field for the drive is in sawmills, although it will be apparent, I believe, that the drive may be used in any conveyer drive. Sawmills in general employ a pond in which to float their logs. Whether a pond is used or not it requires elevating means to bring the log from the water or unloading level up to the operating floor of the mill. It has been general practice to use chain conveyers for this purpose. Considerable difficulty has been experienced, however, in the drive means for this chain. First, a considerable amount of power is required to move the heavy chain and oftentimes several logs which follow one another up the incline. Another condition which adds to the difficulties of this type of drive means is the fact that grougers must be employed to carry the logs. These quite often rip off bark and the like and unless the drive mechanism is arranged to take care of this material it will often clog up the head shaft and lock the mechanism, and throw the chain off the sprocket. A further difficulty encountered is the fact that the pitch of the heavy chains used gradually lengthens with use and it is necessary to have some means for correcting this condition. It has further been found necessary to employ a construction where the reduction gearing will be entirely closed, thus making it safe for workmen and enabling the proper lubrication of the various parts, therefore.

The principal object of my invention is to provide a conveyer drive means which is so arranged that unusual clearance is provided for bark and other débris.

A further object is to provide a drive means which is entirely enclosed, all contained in an oil tight housing.

A further object is to provide means for adapting the drive means to the changing pitch of the log haul chain as it lengthens through use.

A final object is the provision of a drive means wherein the power may be applied at a point well below the operating floor and thus provide additional safety for the workmen.

Other and more specific objects will be apparent from the following description taken in connection with the accompanying drawings, wherein Figure 1 is a side elevation partly broken to more completely illustrate the same.

Figure 2 is a cross sectional view along the line 2—2 of Figure 1.

Figure 3 is an end elevation from the drive side of my drive means.

Figure 4 is a fragmentary detail view illustrating the chain drive sprocket with certain parts broken away to better illustrate the construction.

Figure 5 is a cross sectional view taken along the line 5—5 of Figure 3.

Figure 6 is a fragmentary sectional view taken along the line 6—6 of Figure 5.

Figure 7 is a cross sectional view taken along the line 7—7 of Figure 5.

Figure 8 is a transverse sectional view taken along the line 8—8 of Figure 5.

Figure 9 is a fragmentary cross sectional view taken along the line 9—9 of Figure 8.

Figure 10 is a fragmentary cross sectional view through a portion of the driving sprocket to better illustrate the pitch adjustment.

Figure 11 is a top plan view of my drive means showing an outboard bearing used in connection therewith but with the main sprocket shaft removed.

Referring to the drawings throughout which like reference characters indicate like parts, numeral 12 designates the central housing member of my drive means. This I prefer to form as a casting of more than average strength, and further provided with outstanding support brackets 14, and which is adapted to support the entire device. Centrally disposed on the upper surface of member 12 is a half bearing 16. This is arranged to journal the main or sprocket driving shaft 18. Secured to the upper surface of housing 12 is an upper housing member 20. This is provided on its lower surface and centrally disposed there with a half bearing 22 similar to that formed in member 12 and the two half bearings form the complete journal for shaft 18. As the chain load on the slowly revolving driving sprocket is very great, it is necessary to provide an unusually rigid support for bearings 16 and 22. This I have accomplished by providing the horizontally positioned webs 24 and 25 and the radially positioned webs 26 and 28 in housing 12 and the radially positioned webs 30 and 31 in housing member 20.

Disposed directly below shaft 18 is an intermediate shaft 32. This is provided with a support formed half in housing 12 and half in the lower housing member 34. Disposed directly below shaft 32 is the drive shaft 36. This shaft is usually quite a high speed member and it has been found desirable to mount the same on anti-friction bearings, as is indicated in Figure 5. For additional strength I have provided the vertically disposed webs 35 and 38 which serve to join the bearings together and prevent the gear thrust tending to part the castings.

Referring particularly to Figure 5, shaft 36, which may be driven from any convenient source of power and which is journaled upon the anti-friction bearings 37 and 38, has fixedly secured to it the drive pinion 40 and an oil thrower 42. The exact construction of the oil thrower is more clearly shown in Figure 6 and consists of two similar half members 43 and 44 which are clamped together upon shaft 36 and as they revolve at high speed the outstanding tip portions strike the lubricating oil, which finds its way to the lower portion of the housing and throws it violently upwardly upon the various gears, thus keeping them well lubricated at all times, and further throwing up sufficient oil that it will find its way into the various bearings and keep the revolving parts well lubricated.

Shaft 32 I prefer to use as a fixed or dead shaft. A further advantage is the fact that I may then employ a small bushing gear 46 which may, because of its small size, be conveniently provided with suitable metal bearing 45.

Fixedly secured on one end of bushing 46 is the intermediate gear 48 which is adapted to mesh with drive pinion 40. The other end of bushing 46 is formed as the intermediate pinion. This pinion meshes with the sprocket or main shaft gear 50 which in turn is fixedly secured to the main or sprocket shaft 18. In the gear housing provided by the three members 12, 20 and 34, I have provided an oil tight enclosure for the reduction gearing. At the same time I have provided unusually large bearings for shaft 18. For many drives it is possible to use my device with the main shaft supported only on the bearings 16 and 17 which are formed by the enclosed housing, consisting of the upper and central housing members.

In many instances, however, it is more desirable to use a second support arrangement, as the outboard bearing 52, which is formed by the two matching housing members 54 and 56. This bearing is best illustrated in Figures 5 and 11. Housing member 56 is normally provided with supporting brackets 58. These brackets may preferably be on the same elevation as the brackets 14 of the oil tight housing and in many instances I prefer to secure them together as a unit by the use of connecting members 60.

A very important feature of my present construction is the housing surrounding bearings 17 and 52. This is shown in Figure 3 in dashed lines, Figure 5, Figure 8 and Figure 11. In Figure 7 a typical section is shown thru the bearing and shows the same as a complete circle. Now the size or diameter of this circle is such that the chain attachment block as illustrated in Figure 2 will rest upon the circular housing. The purpose of this is to provide additional security so that bark and débris cannot find its way down in the recess between the socket proper and the end of the two bearings 17 and 52. Forming these two bearing housings as complete circles of a diameter equal to the outside diameter of the circle formed by the chain prevents this occurring.

Disposed between bearings 17 and 52 and fixedly secured to the main shaft 18 is the chain drive sprocket 62. This sprocket should most preferably be of special design as it is necessary to have a sprocket which will adequately support the wide chain at some distance from the shaft so that ample clearance may be left for débris, bark and the like. Further, it is desirable to have this sprocket formed with replaceable teeth and bearing portions so that in case of wear or damage the defective teeth can be quickly replaced. A still further requirement is that the sprocket shall be capable of adjustment to take care of variations in pitch of the chain as the chains tend to increase the link length after being placed in use for some time. To take care of the above conditions I provide that the sprocket shall be formed with a hub portion which is adapted for keying or otherwise securing to the main shaft. Tooth bases 64 are then provided, one for each tooth. These I prefer to recess as at 66 so that the tooth 68 may have a suitable shank 70 which will engage this recess. I then provide a taper locking key 72 which can be driven snugly home and hold the tooth in position. Each tooth must be provided with bearing shoulders 74 so as to position the chain properly. I then provide for shimming at 76 so that as the pitch of the chain increases additional shims may be added, thus in effect increasing the distance between teeth. This has been found of great value in this device.

As shown in Figure 7, which is intended to show the typical section through either bearing 17 or 52, I provide for the extension of webs 26, 28, 30, 31 and 38, which serve a dual function, mainly that of strengthening the castings at the point of greatest strain and also providing proper oil controlling baffles which form the passageways for the circulation of oil through my device.

As shown in Figures 1 and 2 the chain 82 I have found most suitable for this type of drive is a welded link chain. It must be borne in mind that log hauls of this character must be of considerable length and the form of chain shown has proven cheap in first cost and light, so that no undue work must be done in moving the chain. It has, however, the inherent fault of stretching under service and it is because of this characteristic that it has been found necessary to provide the adjustable tooth drive sprocket shown.

Figure 1 also illustrates a very desirable feature of my drive means. In this the source of power as the electric motor "M" may be placed well below the floor "F" upon which the operators stand. In this way the high speed drive is entirely out of the workman's way and the housing as built up enables me to drop the drive shaft 36 well below the floor, a fact I have found to be very desirable.

The unit construction of the drive means as shown enables a manufacturer to completely build up and assemble this unit. It enables the careful fitting of all bearings and gearing. It greatly simplifies the installation at the mill or point of use and it assures that all parts of the equipment are in proper relation to each other. Further, having the speed reducing means in an oil tight housing a large amount of oil may be used which tends at all times to keep the temperatures of the unit low and assures automatic lubrication without attention, except at widely spaced intervals.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

What I claim is:

1. A log haul drive means consisting, in combination, of a central housing member, having outstanding support brackets; an upper housing member; a lower housing member; a main shaft journaled in bearings formed half in each of the central and upper housing members and disposed in the vertical axis of said members; a chain drive sprocket secured to said main shaft, having a hub, a plurality of tooth bases formed as part of said hub and having radially disposed tooth recesses and tangential key receiving openings; sprocket teeth, having chain bearing shoulders, adapted to seat in the tooth recesses; a taper key adapted to secure the teeth in the recesses; means adapted to space the teeth from the tooth bases and permit variations of the sprocket pitch diameter; a sprocket shaft gear secured to said main shaft; an intermediate shaft disposed directly below said main shaft; and secured between the central and lower housing members; a bushing pinion journaled on said intermediate shaft and adapted to drive said sprocket shaft gear; an intermediate gear secured to said bushing pinion; a drive shaft disposed directly below the main shaft and journaled in bearings secured within the lower housing member; a drive pinion secured to the drive shaft adapted to drive the intermediate gear; a plurality of webs formed in the upper and central housing members and radially disposed from the main shaft bearings; a vertical web connecting the main shaft bearing and the intermediate shaft supports and a vertical web connecting the intermediate shaft supports and the drive shaft bearings.

2. A log haul drive means consisting, in combination, of a central housing member, having widely spaced outstanding support brackets; an upper housing member; a lower housing member; an outboard bearing formed of two matching housing members; half bearing housing members disposed on each of the upper housing member and the central member, and similar half housing members on the two matching housing members forming the outboard bearing, said bearing housing, forming complete circles of the diameter, substantially equal to the outside diameter of the chain used with the log haul as it passes around the drive sprocket; a main shaft journaled in bearings formed in the housing members and disposed in the vertical axis of said members; a chain drive sprocket secured to said main shaft; an intermediate shaft disposed directly below said main shaft; a drive shaft disposed directly below the intermediate shaft; drive means operatively connecting the drive shaft, the intermediate shaft, and the main shaft; and a source of power adapted to revolve the drive shaft and disposed below the support brackets so as to be below the floor supporting the housing members.

3. A log haul drive means consisting, in combination of a central housing member, having outstanding support brackets; an upper housing member; a lower housing member; a main shaft journaled in bearings formed in the housing members and disposed in the vertical axis of said members; a chain drive sprocket secured to said main shaft, an intermediate shaft disposed directly below said main shaft; a drive shaft disposed directly below the intermediate shaft; drive means operatively connecting the drive shaft, the intermediate shaft, and the main shaft; a plurality of webs formed in the upper and central housing members and radially disposed from the main shaft bearings; a vertical web connecting the main shaft bearing and the intermediate shaft supports and a vertical web connecting the intermediate shaft supports and the drive shaft bearings.

In witness whereof, I hereunto subscribe my name this 4th day of June A. D. 1931.

VICTOR H. WINQUIST.